(Model.)
M. D. BEACH.
Snell for Fish Hook.
No. 242,866.          Patented June 14, 1881.
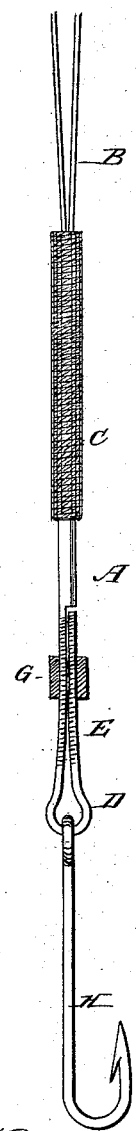
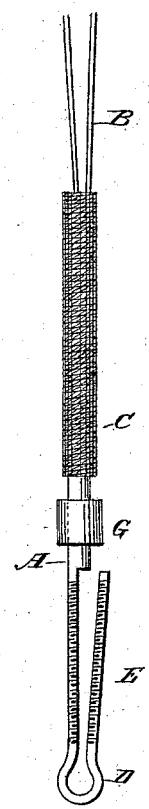
WITNESSES:
Francis McArdle
C. Sedgwick
INVENTOR:
M. D. Beach
BY Munn & Co
ATTORNEYS.

UNITED STATES PATENT OFFICE.

MILO D. BEACH, OF LITCHFIELD, CONNECTICUT.

SNELL FOR FISH-HOOKS.

SPECIFICATION forming part of Letters Patent No. 242,866, dated June 14, 1881.

Application filed April 7, 1881. (Model.)

To all whom it may concern:

Be it known that I, MILO D. BEACH, of Litchfield, in the county of Litchfield and State of Connecticut, have invented a new and Improved Snell for Fish-Hooks, of which the following is a full, clear, and exact description.

The object of my invention is to facilitate attaching a fish-hook to the snell.

The invention consists in a wire stem attached to the end of the snood and provided with a loop that is passed through the eye of the fish-hook, and is then closed by means of a nut that is screwed on the stem and over the looped end of the same.

In the accompanying drawings, Figure 1 is a side view of my improved snell, showing the loop closed. Fig. 2 is a side view of the same, showing the loop opened.

A metal stem or wire, A, is attached to the end of a snood or snell, B, by means of the threads C, and the lower end of this stem A is bent to form a loop, D. The lower part of the stem is of less thickness than the upper part, so that when the shank E of the loop rests against the lower part of the stem A the combined thickness of the two will not be greater than that of the upper part of the stem A. The shank E and the lower part of the stem A are provided with a screw-thread, so that the loop D can be closed by means of a nut, G, on the stem.

The stem may be provided with an eye or ring at the upper end, and may be attached to the line, if desired, in place of being attached to the snell.

To fasten the hook H on the snell the nut G is screwed to the upper end of the stem A, thus permitting the loop to be opened to receive the hook, upon which the shank E is pressed against the stem and the nut G is screwed down again. A hook can thus be fastened to the line very easily and rapidly, and without knotting the line.

Having thus described my invention, what I claim as new, and desire to secure by Letters Patent, is—

The combination, with a fish-hook snell, B, of a wire stem, A, having a shoulder from which the extension is only about half-thickness, doubled to form a loop, D, and having both arms of the doubled part held together by a nut, G, working thereon, as shown and described.

MILO DAVID BEACH.

Witnesses:
EDWIN A. WHITE,
DWIGHT C. KILBOURN.